Sept. 24, 1957  N. TUSO, JR  2,807,477
SHIFTABLE FIFTH-WHEEL MOUNTING FOR TRACTOR-TRAILERS
Filed Jan. 30, 1956  2 Sheets-Sheet 1

Nicholas Tuso, Jr.
INVENTOR.

BY

Sept. 24, 1957 N. TUSO, JR 2,807,477
SHIFTABLE FIFTH-WHEEL MOUNTING FOR TRACTOR-TRAILERS
Filed Jan. 30, 1956 2 Sheets-Sheet 2
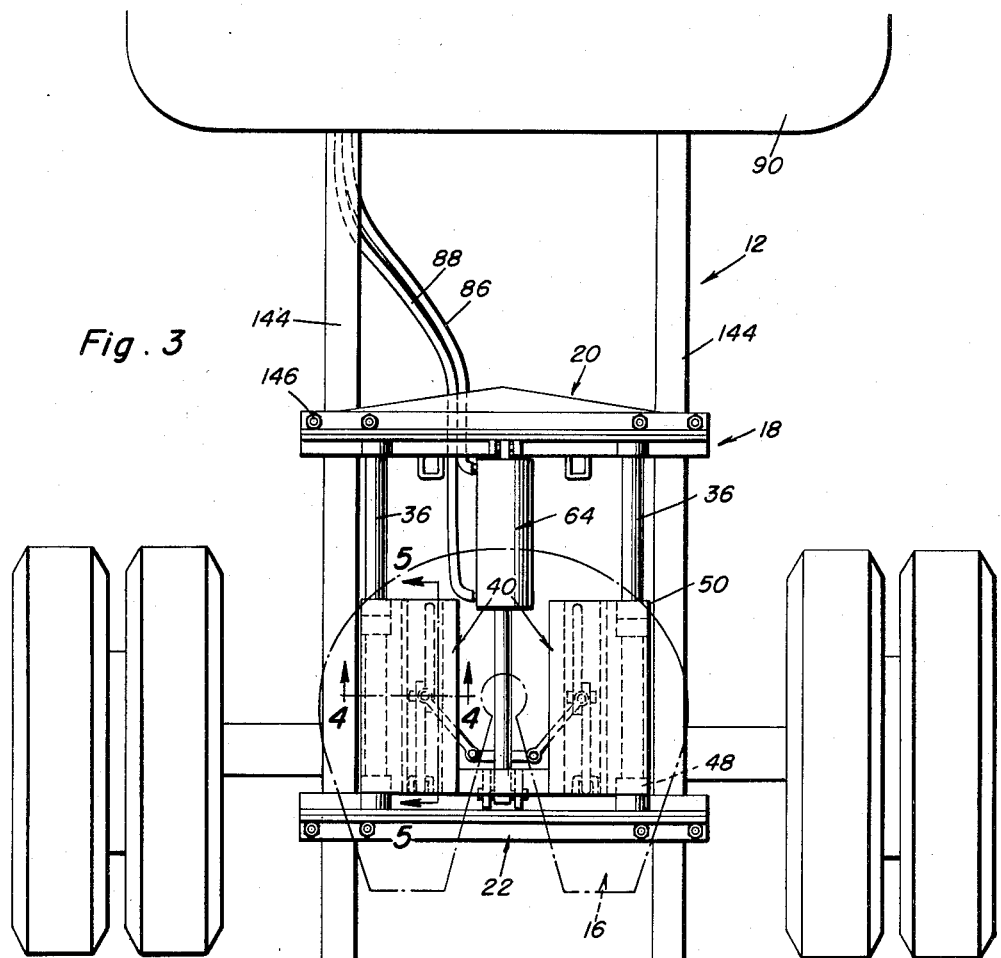
Nicholas Tuso, Jr.
INVENTOR.

United States Patent Office 2,807,477
Patented Sept. 24, 1957

2,807,477

SHIFTABLE FIFTH-WHEEL MOUNTING FOR TRACTOR-TRAILERS

Nicholas Tuso, Jr., Vineland, N. J.

Application January 30, 1956, Serial No. 562,160

5 Claims. (Cl. 280—407)

This invention relates in general to new and useful improvements in tractor-trailer trucks and more specifically to an improved fifth wheel mounting.

In order that the trailer may freely turn with respect to the tractor without striking the cab of the tractor, it is necessary that the trailer be spaced a considerable distance from the tractor. On the other hand, in the normal towing of a trailer, the tractor and trailer may be relatively short coupled. By short coupling the tractor and trailer, not only is the overall length of the tractor-trailer combination decreased so as to conform to maximum state law, but also the weight carried by the tractor from the trailer may be more equally distributed on the wheels of the tractor.

It is therefore the primary object of this invention to provide an improved fifth wheel mounting which is of such a nature whereby a trailer may be mounted on a tractor in the normal position for backing and turning and at the same time may be shifted forwardly with respect to the tractor so as to reduce the length of the tractor-trailer combination.

Still another object of this invention is to provide a shiftable mounting for a fifth wheel, the mounting including a fluid motor which is connected to a carriage supporting the fifth wheel for selectively shifting the carriage along rail supporting the same.

A further object of this invention is to provide an improved fifth wheel mounting which includes a shiftable carriage supporting the fifth wheel, the carriage being provided with latch means for automatically latching the carriage in selected positions.

A still further object of this invention is to provide an improved fifth wheel mounting assembly which includes a fifth wheel supporting carriage mounted upon a pair of rails for longitudinal movement, there being carried by the carriage latch means, there being connected to the carriage a fluid motor for shifting the carriage, the fluid motor being connected to the latch means for automatically rendering the same inoperative prior to the shifting of the carriage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged fragmentary top plan view of the tractor of Figure 1 with the trailer removed therefrom and shows further the details of the fifth wheel mounting, the fifth wheel being in a rearwardly disposed position;

Figure 1:
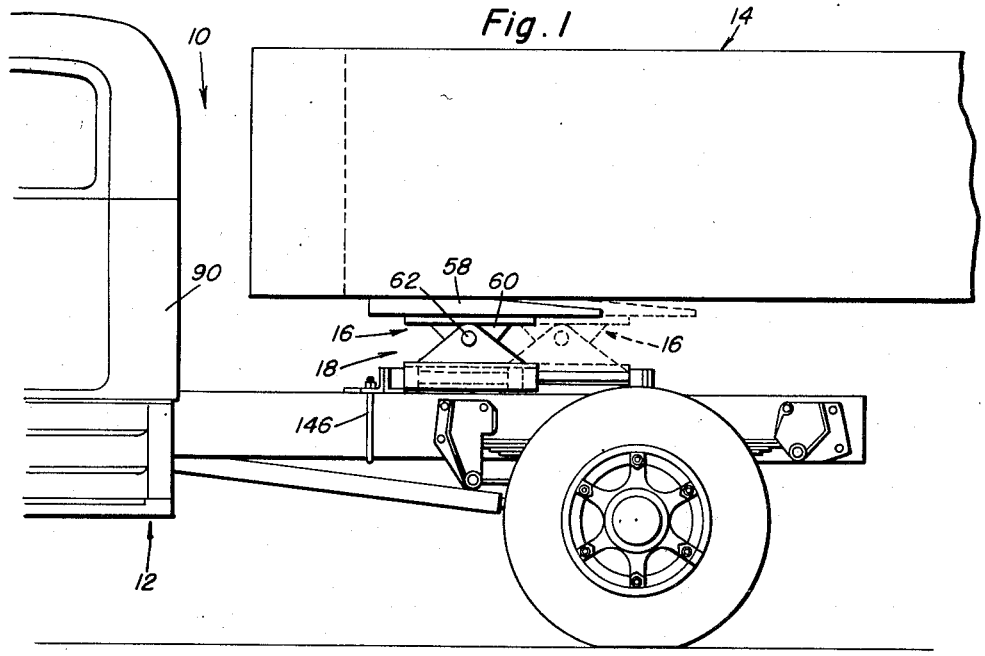
Figure 1 is a fragmentary side elevational view of a tractor-trailer combination employing the fifth wheel mounting which is the subject of this invention, the tractor-trailer being shown in a short coupled position by solid lines and the initial position of the trailer and fifth wheel being shown in dotted lines.

Figure 4 is an enlarged fragmentary vertical sectional view taken substantially upon the plane indicated by the section line 4—4 of Figure 3 and shows the manner in which latch members are mounted with respect to the carriage for pivotal movement; and Figure 5 is an enlarged fragmentary longitudinal vertical sectional view taken substantially upon the plane indicated by the section line 5—5 of Figure 3 and shows the cam means for selectively moving the latch members to inoperative positions.

Referring now to the drawings in detail, it will be seen that there is illustrated a tractor-trailer combination which is referred to in general by the reference numeral 10. The tractor-trailer combination 10 includes a tractor, which is referred to in general by the reference numeral 12, and a trailer which is referred to in general by the reference numeral 14. In order that the tractor 12 and the trailer 14 may be coupled together for movement along the road, there is provided a fifth wheel assembly which is referred to in general by the reference numeral 16. The fifth wheel assembly 16 is supported with respect to the tractor 12 by means of the fifth wheel mounting which is the subject of this invention, the fifth wheel mounting being referred to in general by the reference numeral 18.

Figure 2:
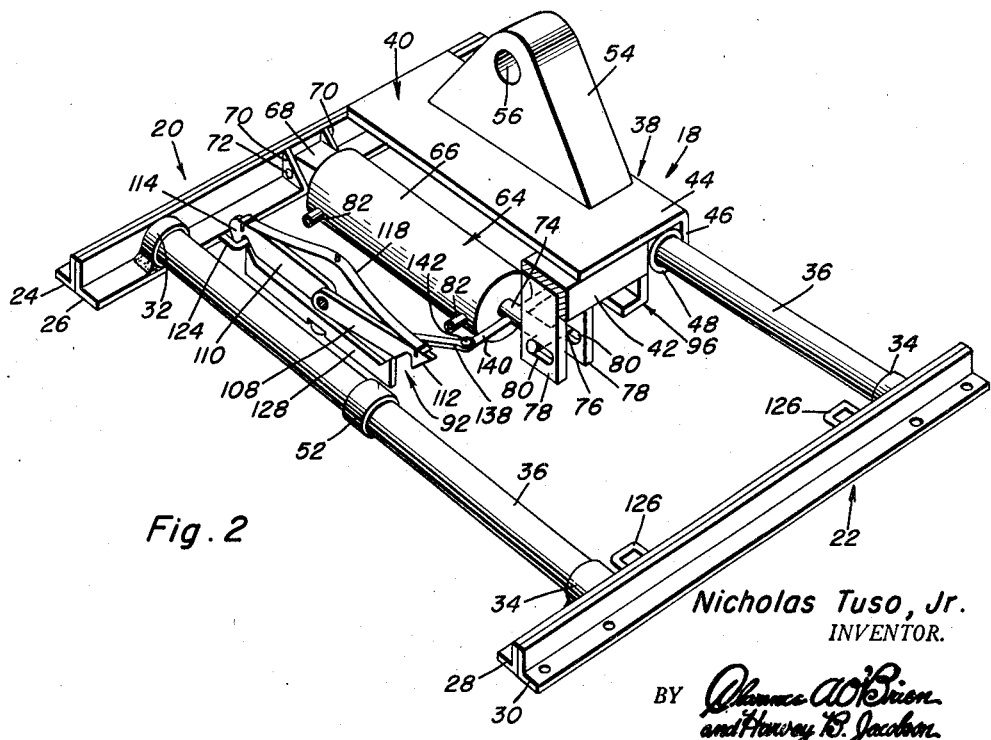
Figure 2 is an enlarged fragmentary perspective view of the fifth wheel mounting and shows the specific details thereof.

Referring now to Figure 2 in particular, it will be seen that the fifth wheel mounting 18 includes support means including a front support rail 20 and a rear support rail 22. The front support rail 20 is formed of a pair of angle members 24 and 26 which are arranged in face-to-face relation so as to be of inverted T-outline. The rear support member 22 is also formed of a pair of angle members 28 and 30 which are connected together in back to back relation so as to have an inverted T-outline.

Carried by the angle members 26 and 28 adjacent opposite ends thereof are aligned mounting sleeves 32 and 34, respectively. Disposed in opposite ends of the mounting sleeves 32 and 34 are elongated tubular rails 36.

Mounted on the rails 36 for movement therealong is a carriage which is referred to in general by the reference numeral 38. The carriage 38 is formed of a pair of transversely spaced sections 40 which are connected together at their rear ends by a transverse frame member 42. Each of the sections 40 is angular in cross section and includes a relatively wide upper horizontal flange 44 and an outer vertical flange 46. Carried by the rear portions of the flanges 44 and 46 at their intersection is a rear sleeve 48. A similar front sleeve 50 is disposed at the forward edge of the flanges 44 and 46. The sleeves 48 and 50 are received on the rails 36 to support the carriage 38 for movement along the rails 36. In order that the carriage 38 may be stopped at opposite ends of the rails 36, each of the rails 36 is provided with an intermediate stop collar 52 which are engaged by the sleeves 48 and 50 to limit shifting of the carriage 38.

Carried by each of the sections 40 is an upstanding ear 54 having a transverse bore 56. The fifth wheel assembly 16 includes a fifth wheel plate 58 having depending from opposite sides thereof ears 60. The ears 60 are pivotally connected to the ears 54 by means of transversely aligned pins 62 extending therethrough. Thus the fifth wheel assembly 16 is mounted on the carriage 38 for shifting along the rails 36 therewith.

In order that the carriage 38 may be selectively shifted, there is provided a double acting fluid motor 64. The fluid motor 64 includes a cylinder 66 which has a mounting fitting 68 at one end thereof. The mounting fitting 68 is disposed between a pair of plates 70 carried by the angle member 26 and pivotally connected thereto by a transverse pivot pin 72.

Mounted in the cylinder 66 is a piston (not shown) to which there is connected an elongated piston rod 74. The piston rod 74 extends out through the rear end of the cylinder 66 and has connected thereto a transverse pin 76. Depending from the transverse frame member 42 is a pair of spaced parallel plates 78 having formed therein longitudinally elongated slots 80. The pin 76 has opposite ends thereof disposed in the slots 80 and form in conjunction with the slots 80 a lost motion connection between the fluid motor 64 and the carriage 38.

Connected to opposite ends of the cylinder 66 are fittings 82 and 84. The fittings 82 and 84 may be either connected to the air system of the tractor 12 or connected to some suitable hydraulic pump depending upon the type of fluid utilized in actuating the fluid motor 64.

Although the fluid motor 64 has been illustrated as being connected to the front support member 20 and extending rearwardly therefrom, if desired, it may be mounted on the rear support member 22 and extend forwardly therefrom. Inasmuch as the fluid motor 64 is of the double acting type, it may be utilized for moving the carriage 38 both forwardly and rearwardly.

Connected to the fittings 82 and 84 are fluid lines 86 and 88 which extend into the cab 90 of the tractor 12 where flow of fluid therethrough is controlled by a valve (not shown) mounted for ease of operation by the operator of the tractor 12.

In order that the carriage 38 may be latched against movement at opposite ends of its travel, there is carried by each of the carriage sections 40 a latch assembly which is referred to in general by the reference numeral 92.

Referring now to Figure 4 in particular, it will be seen that carried by the horizontal flange 44 of each carriage section 40 is a depending vertical flange 94 of an angle member 96. The angle member 96 includes a lower inwardly directed flange 98. Disposed adjacent the angle member 96 is an angle member 100 which is disposed in spaced parallel relation with respect to the angle member 96, the angle members 96 and 100 extending longitudinally. The angle member 100 includes an upper horizontal flange 102 which is secured to the underside of the flange 44, and a depending vertical flange 104 which is in spaced parallel relation with respect to the flange 94. Extending between the flanges 94 and 104 is a pivot pin 106.

Disposed between the flanges 96 and 104 and pivotally mounted on the pivot pin 106 are latch members 108 and 110 which face in opposite directions. The latch members 108 and 110 are provided at their remote ends with downwardly facing hooks 112 and 114, respectively.

Carried by the flange 44 and connected thereto at its center point by means of a pin 116 is an elongated leaf spring 118. The opposite ends of the leaf spring 118 are connected to the hook portions 112 and 114 by means of pins 120 and 122, respectively. The leaf spring 118 urges the latch members 108 downwardly to operative positions.

Carried by the support members 20 and 22 are U-shaped keepers 124 and 126 which are selectively engaged by the hook portions 114 and 112, respectively. It will be readily apparent that the hook portions 112 and 114 will automatically be engaged with the keepers 124 and 126 due to the action of the spring 118.

In order that the hook portions 112 and 114 may be selectively elevated so as to be disengaged from the keeper members 126 and 124, respectively, there is slidably carried by the angle member 96 an elongated cam member 128 having cam surfaces 130 and 132 at opposite ends thereof. The latch members 108 and 110 are provided adjacent the hook portions 112 and 114, respectively, with downwardly directed cam surfaces 134 and 136 which are selectively engaged by the cam surfaces 130 and 132, respectively.

In order that the cam member 128 may be shifted longitudinally relative to the latch members 108 and 110, there is pivotally connected to the central portion of each cam member 128 a link 138. Carried by the piston rod 74 adjacent the pin 76 is a transverse pin 140. The ends of the links 138 remote from the cam members 128 are connected to opposite ends of the pin 140 by means of pivots 142.

Assuming the carriage 38 to be in the position illustrated in Figure 2, the carriage 38 will be prevented from shifting to the right away from the front support member 20 by the engagement of the hook portions 114 in the keepers 124. However, when it is desired to move the carriage 38 to the right, the fluid motor 64 is actuated to cause the rearward extension of the piston rod 74. As the piston rod 74 initially moves rearwardly or to the right, the pin 140 moves to the right to draw the cam members 128 to the right whereby the cam surfaces 130 thereof will engage the cam surfaces 134 and thus lift the hook portions 114 out of engagement with the keepers 124 against the resilient downward urging of the leaf spring 118. After the hook portions 112 have been released from the keeper 124, the pin 76 will reach the right or rear end of its travel in the slots 80 and thus the carriage 38 will then be moved to the right or rearwardly by the fluid motor 64. When the carriage 38 reaches the right end of its travel, as viewed in Figure 2, the hook portions 112 will ride up over the keepers 126 and become locked therewith. Thus the latch members 108 together with their cooperation with the keepers 126 will prevent the forward movement of the carriage 38.

When it is desired to move the carriage 38 forwardly to the position illustrated in Figure 2, the piston rod 74 is retracted. Because of the lost motion connection between the piston rod 74 and the carriage 38, the cam members 128 will again be shifted so as to release the latch assembly 92.

Referring now to Figure 3 in particular, it will be seen that the support members 20 and 22 extend transversely of longitudinally extending frame rails 144 of the tractor 12. The support members 20 and 22 are connected to the frame rails 144 by means of suitable U-bolts 146, as is best illustrated in Figure 1. The U-bolts 146 firmly clamp the fifth wheel mounting 18 in a desired position on the tractor 12.

In the operation of the present invention the fifth wheel 16 is disposed in the rear dotted line position of Figure 1. This is the normal position of a fifth wheel thus providing the necessary clearance between the tractor cab 90 and the trailer 14 for all phases of operation of the tractor-trailer combination. Once the tractor-trailer combination 10 is ready for the road, in order that its overall length may be shortened and at the same time the load applied from the trailer to the tractor may be properly positioned with respect to the wheels of the tractor 12, the operator of the tractor 12 will actuate the fluid motor 64. The fluid motor 64 will then pull the carriage 38 forwardly to position the fifth wheel assembly 16 in its forwardmost position of Figure 1. If desired, although not necessary, the wheels of the trailer 14 may be chocked at this time and the tractor 12 backed up slowly. However, the fluid motor 64 should have sufficient strength to pull the trailer forward at the time the carriage 18 is moved forwardly.

When the tractor 12 and the trailer 14 are short coupled, the tractor-trailer combination 10 is ready for ordinary driving along the road. When it is found necessary to turn the tractor-trailer combination 14 sharply and in order to provide the necessary clearance between the trailer 14 and the tractor cab 90, the control valve (not shown) for the fluid motor 64 is moved in an opposite direction to extend the piston rod 74 and move the carriage 38 and the fifth wheel assembly 16 rearwardly.

The foregoing is considered as illustrative only of the principles of the invention. Further, since numerous modifications and changes will readily occur to those skilled in the art, it is not desired to limit the invention to the exact construction and operation shown and de-

What is claimed as new is as follows:

1. A fifth wheel mounting assembly comprising at least one longitudinal rail, support means for said rail at opposite ends of said rail, a carriage mounted on said rail for movement therealong, means on said carriage for mounting a fifth wheel, operating means carried by said support means connected to said carriage for shifting said carriage on said rail, and cooperating latch means on said carriage and said support means selectively retaining said carriage at opposite ends of said rail, linkage connecting said latch means to said operating means for movement of said latch means to an inoperative position.

2. A fifth wheel mounting assembly comprising at least one longitudinal rail, support means for said rail at opposite ends of said rail, a carriage mounted on said rail for movement therealong, means on said carriage for mounting a fifth wheel, operating means carried by said support means connected to said carriage for shifting said carriage on said rail, and cooperating latch means on said carriage and said support means selectively retaining said carriage at opposite ends of said rail, linkage connecting said latch means to said operating means for movement of said latch means to an inoperative position, a lost motion connection between operating means and said carriage whereby said latch means are rendered inoperative prior to movement of said carriage.

3. A fifth wheel mounting assembly comprising at least one longitudinal rail, support means for said rail at opposite ends of said rail, a carriage mounted on said rail for movement therealong, means on said carriage for mounting a fifth wheel, operating means carried by said support means connected to said carriage for shifting said carriage on said rail, and cooperating latch means on said carriage and said support means selectively retaining said carriage at opposite ends of said rail, linkage connecting said latch means to said operating means for movement of said latch means to an inoperative position, said latch means including pivotally mounted latch members, means resiliently urging said latch members into carriage locking position.

4. A fifth wheel mounting assembly comprising at least one longitudinal rail, support means for said rail at opposite ends of said rail, a carriage mounted on said rail for movement therealong, means on said carriage for mounting a fifth wheel, operating means carried by said support means connected to said carriage for shifting said carriage on said rail, and cooperating latch means on said carriage and said support means selectively retaining said carriage at opposite ends of said rail, linkage connecting said latch means to said operating means for movement of said latch means to an inoperative position, said latch means including pivotally mounted latch members, means resiliently urging said latch members into carriage locking position, cam means, said linkage being connected to said cam means for shifting said cam means into engagement with said latch members.

5. A fifth wheel mounting assembly comprising at least one longitudinal rail, support means for said rail at opposite ends of said rail, a carriage mounted on said rail for movement therealong, means on said carriage for mounting a fifth wheel, operating means carried by said support means connected to said carriage for shifting said carriage on said rail, and cooperating latch means on said carriage and said support means selectively retaining said carriage at opposite ends of said rail, said operating means including a fluid motor, means connecting said fluid motor to said latch means, a lost motion connection between said operating means and said carriage whereby said fluid motor moves said latch means to an inoperative position prior to movement of said carriage.

References Cited in the file of this patent

UNITED STATES PATENTS

| | | |
|---|---|---|
| 1,887,118 | Collinge | Nov. 8, 1932 |
| 2,317,508 | Zoder | Apr. 27, 1943 |
| 2,681,231 | Kondracki | June 15, 1954 |